May 19, 1942.  H. D. LATHROP  2,283,679
WASHING DEVICE
Filed Dec. 19, 1938  3 Sheets-Sheet 1

Inventor. Harry D. Lathrop
By Chritton, Wiles, Davies, Hirschl & Dawson Attys

May 19, 1942.　　　H. D. LATHROP　　　2,283,679
WASHING DEVICE
Filed Dec. 19, 1938　　　3 Sheets-Sheet 2

Inventor: Harry D. Lathrop
By Chritton, Wiles, Davies, Hirschl & Dawson Attys.

May 19, 1942.　　　H. D. LATHROP　　　2,283,679
WASHING DEVICE
Filed Dec. 19, 1938　　　3 Sheets-Sheet 3
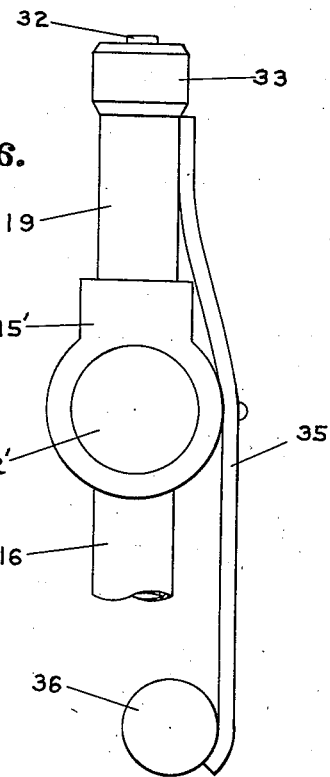
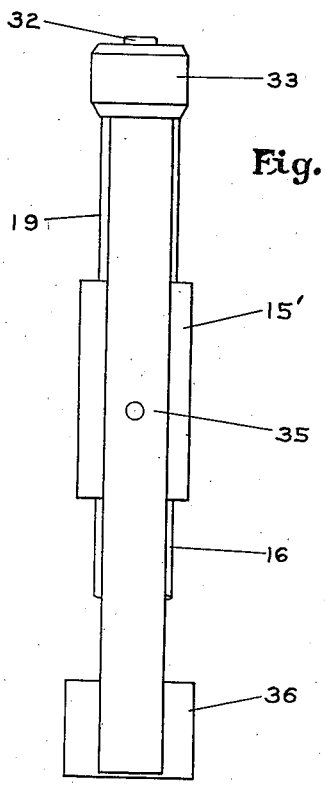
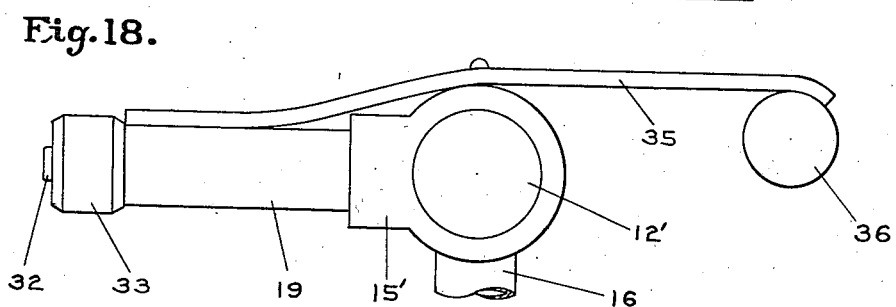
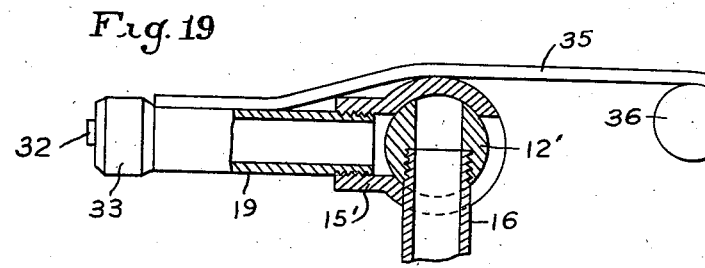
Inventor. Harry D. Lathrop
By Chitton, Wiles, Davies, Hirschl & Dawson attys Patented May 19, 1942

2,283,679

UNITED STATES PATENT OFFICE 2,283,679

WASHING DEVICE

Harry D. Lathrop, Chicago, Ill., assignor to The Lathrop-Paulson Company, Chicago, Ill., a corporation of Illinois Application December 19, 1938, Serial No. 246,696

9 Claims. (Cl. 141—7)

This invention relates to a jet device for washing, rinsing, and cleaning various articles, such as, for example, the interior of milk cans, etc. While the invention is described hereinafter in connection with washing with liquids, it may be used with steam, air, and other fluids.

An object of the invention is to provide an extremely simple mechanism whereby milk cans or the like, which are being carried upon conveyors, engage the jet to move the same out of the path of the cans and yet permit it to be automatically introduced within the can at an elevated position for cleaning the interior of the can. A further object is to provide means whereby a rotating jet device is moved past the constricted opening of a can and into the interior thereof so as to direct the spray over areas within the can. A still further object is to provide automatic means for raising the discharge end of the device into the interior of the can where the rotating discharge nozzle delivers the washing fluid uniformly about the interior of the can. Other specific objects and advantages will appear as the specification proceeds.

The invention is illustrated, in a preferred embodiment, by the accompanying drawings, in which—

Figure 1:
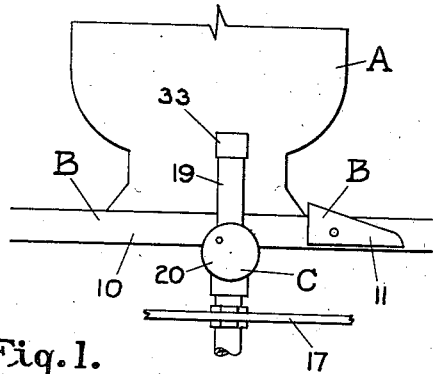
Figure 2:
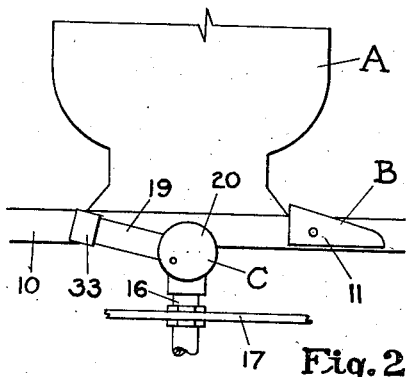
Figure 3:
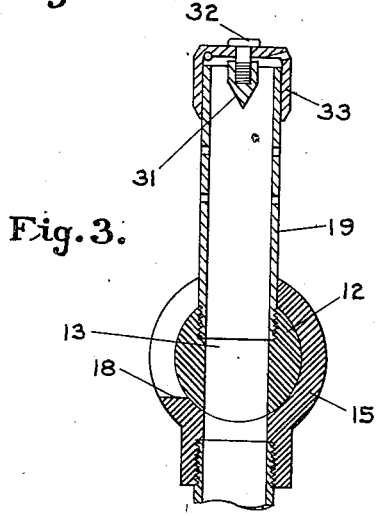
Figure 4:
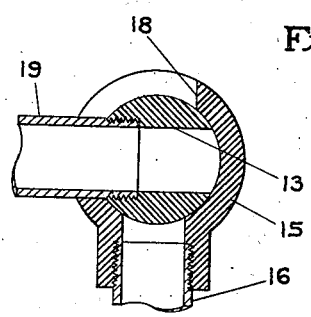
Figure 5:
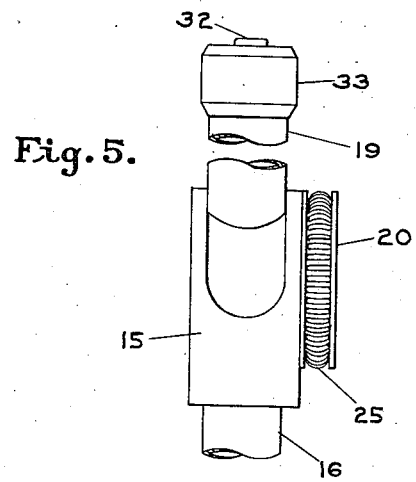
Figure 6:
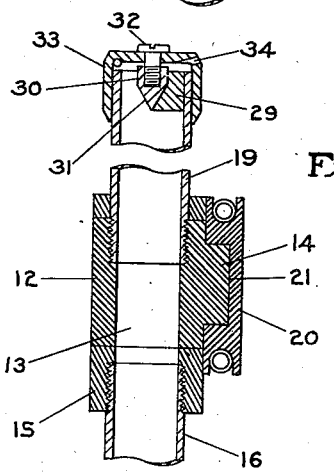
Figure 7:
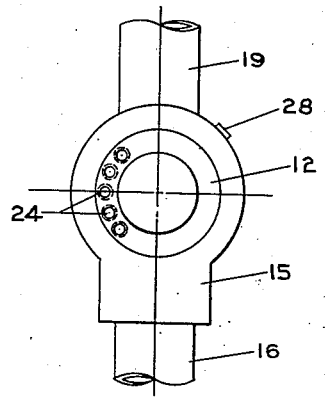
Figure 8:
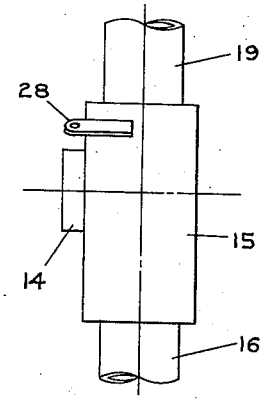
Figure 9:
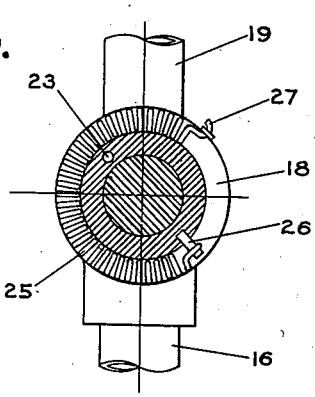
Figure 10:
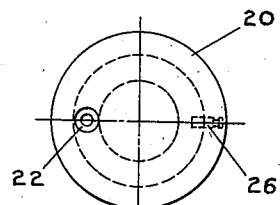
Figure 11:
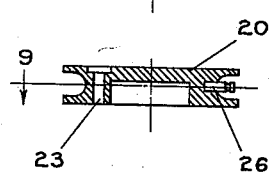
Figure 12:
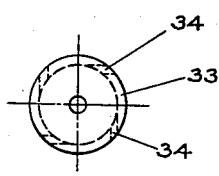
Figure 14:
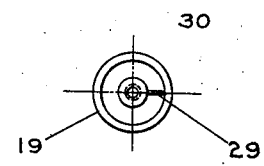
Figure 13:
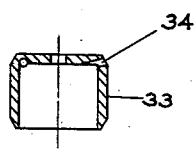
Figure 15:
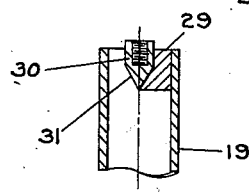

Figure 1 is a broken side view in elevation of my automatic jet in combination with a conveyor for milk cans; Fig. 2, a view similar to Fig. 1 but showing the jet in closed position, the jet being moved to one side by engagement with the can; Fig. 3, an enlarged vertical sectional view of the jet, as shown in Fig. 1; Fig. 4, a broken sectional view of the jet in closed position; Fig. 5, a broken side view in elevation of the jet showing means for maintaining it in vertical position; Fig. 6, a longitudinal view of the structure shown in Fig. 5; Fig. 7, a front view in elevation of the device, the spring wheel being removed; Fig. 8, a side view in elevation of the structure shown in Fig. 7; Fig. 9, a front sectional view, the section being taken as indicated at line 9 of Fig. 11; Fig. 10, a front view of the spring wheel removed from the apparatus; Fig. 11, a transverse sectional view of the spring wheel; Fig. 12, a plan view of the rotatable nozzle; Fig. 13, a vertical sectional view of the nozzle shown in Fig. 12; Fig. 14, a plan view of the discharge pipe, the nozzle being removed; Fig. 15, a vertical sectional view of the discharge pipe shown in Fig. 14; Fig. 16, a broken side view in elevation of a modified form of device employing a weight member; Fig. 17, a front view in elevation of the structure shown in Fig. 16; Fig. 18, a side view in elevation of the structure shown in Fig. 16, the spray device being shown in horizontal position; and Fig. 19 is a sectional view of the device shown in Figs. 16 to 18.

In the illustration given, A designates a milk can; B, a conveyor; and C, the jet device embodying my invention.

The milk can or other device to be cleaned may be of any suitable type or structure. It is important that the nozzle be above the neck in order to clean the interior because the lower bell-shaped portion of the neck would otherwise deflect the spray downwardly.

The conveyor B is of old and well-known construction and need not be described in any detail. It consists of rails 10 upon which the can A slides and reciprocating pivot-dog mechanism 11 which carries the can along the track 10.

The jet member C comprises a main body 12 provided with a central bore 13 and having on one side a bearing 14.

The member 12 is rotatably housed within the fixed sleeve 15, the sleeve 15 being carried by the pipe 16 which in turn is clamped to the stationary plate 17. The sleeve 15 is provided on one side with a slot 18 through which extends the discharge pipe 19 threadedly secured to the inner rotatable member 12.

Any suitable means for maintaining the discharge pipe 19 in vertical position may be employed. In the illustration given, I provide a spring wheel 20 which is recessed at 21 so as to receive the bearing 14. A pin 22 extends through an opening 23 in the wheel 20 and engages one of a series of adjustment screw openings 24 in the side of the member 12. Thus, rotation of the inner member 12 causes rotation of the wheel 20. A spring 25 is secured to a post 26 fixed to the wheel 20 and the other end 27 of the spring engages a bracket 28 carried by the outer sleeve 15. By placing the spring in position under suitable tension, the discharge pipe 19 may be maintained normally in vertical position.

When the pipe 19 is in vertical position, it will be observed that the valve passage 13 directly connects the lower pipe 16 with the pipe 19 so that fluid can pass through. When the pipe 19 is pressed to the angle shown in Fig. 4, the flow of liquid is interrupted.

By providing a discharge pipe of the height illustrated, I find that it is possible to employ a rotatable jet nozzle which washes the interior of the can above the neck. I secure to the top of the pipe 19 a thin bracket member 29 which may be welded to the pipe 19 or secured within a slit thereof, the bracket 29 having integrally formed therewith an interiorly threaded boss 30, the lower portion of the boss being tapered to a point as indicated by the numeral 31. A screw 32 extends through an opening in the rotatable nozzle 33 and engages the threaded boss 30. The rotatable nozzle 33 is provided with diagonally formed openings 34 which, under the force of liquid passing therethrough, causes the nozzle 33 to rotate.

Operation

In the operation of the device, I first assemble the spring wheel 20 upon the bearing 14 and tension the spring 25 sufficiently to maintain the discharge pipe 19 in vertical position, the proper tensioning being obtained by the placing of the adjustment screw 22 in the proper opening 24.

The supporting pipe 16 is firmly secured in position upon the plate 17 below the conveyor B. As the can A moves forward, the forward end of the can strikes the discharge pipe 19 and the member 33, tilting it to the position shown in Fig. 2. Thus there is no opportunity for liquid to spray into the bell-shaped mouth of the can. When the can has moved forward upon conveyor B a short distance, however, the member 19 clears the mouth of the can and under the force of spring 25 swings to the vertical position shown in Fig. 1. Here the spray is discharged well above the bell of the can and where it is effective in cleaning the interior thereof. In the position shown in Fig. 2, it will be observed that the member 33 is drawn outwardly to its outermost position, thus tending to hold the nozzle in down position until complete clearance of the can neck is effected. Then in the upward swing, the member 33 is free to swing inwardly slightly, thus facilitating the quick raising of the pipe 19. Thus when the discharge device 33 starts rotating, it is positioned well above the neck of the can. As the can is drawn forward, it draws the pipe 19 downwardly against the force of the spring and allows the can to clear it.

If the cans are arranged close together, the jet may be kept constantly in depressed condition arising only when the jet is inside the can. If preferred, a valve may be employed, as in common practice, for closing off the pipe 16 except when a can is directly thereabove. Such apparatus for controlling the flow of liquid to the nozzle only when a can is thereabove, is well known in the art and need not be described, forming as it does no part of the present invention.

As already pointed out, when the pipe 19 is in vertical position, as shown in Figs. 1 and 3, the passage 13 is aligned with the pipes 16 and 19 and liquid is discharged therethrough. When the pipe 19 is inclined, the body 12 serves as a valve to close off the opening leading from pipe 16 and thus prevents the flow through discharge pipe 19.

The bracket support for the rotatable nozzle 33 is extremely thin and offers practically no resistance to the flow of water. If desired, the pipe may be enlarged slightly at this point. The screw member 32 offers little resistance to the rotating member 33 and permits rapid rotation thereof. Further, it permits vertical movement of the member 33 along the pipe 19. Should the nozzle 33 become worn, it can be replaced in a very short time.

The apparatus described is extremely simple in structure and inexpensive to build. It effectively cleans the interior of the cans by automatically raising the jet to a position above the neck of the can, in which position the jet can alone be effective. The can itself automatically operates the device, no other mechanism being necessary.

It will be observed that the slot 18 in the outer sleeve 15 provides a stop for the discharge pipe 19 in either extreme of its position.

In the modification shown in Figs. 16, 17 and 18, a weight member is used instead of the spring heretofore described. In this structure, the upper discharge pipe 19 is fixed to the casing 15' which swings about the central portion 12' in the movement of the discharge pipe 19. To maintain the pipe 19 substantially in vertical position, as shown in Fig. 16, I employ a metal strap 35 which is welded to pipe 19 and which extends therebelow, the lower free end of strap 35 being welded to a weight member 36. This structure serves two uses. The metal strap provides a wear member which is engaged by the lip of the can when the pipe 19 is swung to horizontal position, while at the same time the strap serves as a weight for normally maintaining the discharge pipe 19 in vertical position.

While in the foregoing description, I have set forth a detailed structure useful for the purposes described, it will be understood that such structure may be greatly modified without departing from the spirit of my invention.

The foregoing detailed description has been given for clearness of understanding only, and no unnecessary limitations should be understood therefrom, but the appended claims should be construed as broadly as permissible, in view of the prior art.

I claim:

1. In a device of the character set forth, a sleeve member equipped with a discharge pipe, a member mounted within said sleeve and having a discharge therethrough adapted to be brought into communication with said discharge pipe, a pipe communicating with said passage in said inner member, and weight means normally maintaining said discharge pipe in vertical position.

2. In a device of the character set forth, a casing member provided with a passage therethrough, a flow pipe communicating with said passage, a rotatable member mounted upon said casing and equipped with a discharge pipe, a metal strap secured to the forward end of said pipe and adapted to be engaged when said pipe is moved to horizontal position, said strap being equipped at its lower end with a weight normally urging said discharge pipe toward vertical position, said passage through said casing being in communication with the discharge pipe when said discharge pipe is in vertical position.

3. In apparatus of the character set forth for washing the interior of a milk can provided with a constricted neck, a conveyor for carrying said can with the neck thereof lowermost, a fluid pipe leading from a pressure source of supply, a discharge member swingably supported by said fluid pipe and when in operative position extending into said can beyond the constricted neck thereof, said conveyor being arranged to bring the neck of the can into engagement with the discharge member to swing the same downwardly to a position beneath the can, and means for urging the discharge member upwardly towards vertical position whereby when the neck of the can is released from engagement with the discharge member the member moves upwardly into the can.

4. In apparatus of the character set forth for washing the interior of a milk can provided with a constricted neck, a conveyor for carrying said can with the neck thereof lowermost, a fluid pipe leading from a pressure source of supply, a pivotally mounted discharge member below said conveyor communicating with said pipe and extending into said can beyond and immediately adjacent the constricted neck thereof, means provided by said conveyor for bringing the neck of the can into engagement with said discharge member to swing the same downwardly to a position underneath the can, means for urging said discharge member upwardly into the can when the member is not engaged by the can, and a rotatable discharge nozzle mounted on said discharge member, said nozzle being arranged to rotate upon said member when fluid is passed therethrough.

5. In apparatus of the character set forth for washing the interior of a milk can provided with a constricted neck, a conveyor for carrying said can with the neck thereof lowermost, a fluid pipe leading from a pressure source of supply, an oscillatably mounted discharge member below said conveyor communicating with said pipe and extending upwardly into said can beyond and immediately adjacent to the constricted neck thereof, said discharge member being swingable downwardly to a position underneath the can when engaged by the can, and weight means for urging said member upwardly toward vertical position when the member is not engaged by the can.

6. In apparatus of the character set forth for washing the interior of a can provided with a constricted neck and with an inclined portion immediately adjacent said neck, said apparatus being equipped with a conveyor for moving the can with the open neck thereof upon the conveyor, a washing device comprising a discharge member normally adapted to extend into said can beyond and immediately adjacent to the constricted neck thereof whereby a fluid discharged laterally from said member is received on said inclined portion of the can, said member being yieldable to permit the can to pass thereover, a rotatable nozzle mounted on said member and provided with a discharge orifice, said nozzle being adapted to rotate upon said member when the fluid is passed thereto and being longitudinally movable with respect to said member, and means for supplying fluid to said member when the same is inside the can.

7. In apparatus of the character set forth for washing the interior of a can provided with a constricted neck, said apparatus being equipped with a conveyor for moving a can with the open neck thereof upon said conveyor, a washing device comprising a tiltably supported discharge member below said conveyor and provided with a discharge pipe extending upwardly into the can beyond and immediately adjacent to the constricted neck thereof, means for normally maintaining said discharge pipe in vertical position, means provided by said conveyor for bringing the neck of the can into engagement with said discharge pipe to tilt the same downwardly to permit the can to pass over the discharge pipe, means for supplying fluid to said pipe when the same is in substantially vertical position, and a rotatable discharge nozzle carried by said pipe and longitudinally movable thereon for a limited distance.

8. In apparatus of the character set forth for washing the interior of a milk can provided with a constricted neck and with an inclined portion immediately adjacent the neck and extending towards the interior of the can, means for supporting said can with the neck thereof lowermost, a fluid pipe leading from a pressure source of supply, a discharge member mounted below said support means for oscillating movement in a single plane, said discharge member being arranged to extend upwardly into said can beyond and immediately adjacent the constricted neck thereof whereby fluid discharged from said member is received on said inclined portion of the can, and being provided with a passage communicating with said fluid pipe when the discharge member is in vertical position, the member being swingable to horizontal position wherein the passage is removed from communicating relation with said pipe, conveyor means movable in a plane parallel to the plane of oscillation of said member for bringing the neck of the can into engagement with the discharge member to swing the same downwardly to permit the can to pass thereover, and means for continuously urging said discharge member upwardly towards vertical position whereby, the member, when not in engagement with the can, is maintained in vertical position.

9. In apparatus of the character set forth for washing the interior of a milk can provided with a constricted neck, a conveyor for carrying said can with the neck thereof lowermost, a fluid pipe leading from a pressure source of supply, a discharge member supported below said conveyor and mounted for oscillation, said discharge member communicating with said pipe and adapted to extend upwardly into said can beyond the constricted neck thereof, said discharge member being adapted to be swung to a substantially horizontal position and to a substantially vertical position, means associated with said discharge member for stopping the flow of fluid from said supply pipe when said member is swung to substantially horizontal position and for permitting flow from the supply pipe to said member when said member is swung to substantially vertical position, said member being adapted to be engaged by the neck of the can to cause said member to swing downwardly to substantially horizontal position underneath the can, and means for urging said discharge member upwardly when not in engagement with said can whereby said member is returned to substantially vertical position.

HARRY D. LATHROP.